(12) United States Patent
Hsieh et al.

(10) Patent No.: US 8,482,260 B2
(45) Date of Patent: Jul. 9, 2013

(54) POWER MANAGEMENT SYSTEM HAVING CHARGING CONTROL UNIT AND POWER SWITCHING CONTROL UNIT

(75) Inventors: Hsiang-chi Hsieh, Sindian (TW); Chin-ching Chan, Sanchong (TW)

(73) Assignee: Genesys Logic, Inc., Shindian, Taipei (TW)

( * ) Notice: Subject to any disclaimer, the term of this patent is extended or adjusted under 35 U.S.C. 154(b) by 995 days.

(21) Appl. No.: 12/542,889

(22) Filed: Aug. 18, 2009

(65) Prior Publication Data

US 2009/0309426 A1    Dec. 17, 2009

Related U.S. Application Data

(63) Continuation-in-part of application No. 11/758,536, filed on Jun. 5, 2007, now abandoned.

(51) Int. Cl.
*H02J 7/00* (2006.01)
(52) U.S. Cl.
USPC ............................................ 320/138; 307/66
(58) Field of Classification Search
USPC .................... 320/138; 307/20–22, 25, 26, 28, 307/66
See application file for complete search history.

(56) References Cited

U.S. PATENT DOCUMENTS

| | | | | |
|---|---|---|---|---|
| 5,969,438 | A | * | 10/1999 | Odaohara ........................ 307/80 |
| 6,288,522 | B1 | * | 9/2001 | Odaohhara et al. ............ 320/138 |
| 7,615,965 | B2 | * | 11/2009 | Popescu-Stanesti et al. . 320/128 |
| 7,657,290 | B2 | * | 2/2010 | Veselic et al. ................. 455/572 |
| 2005/0253560 | A1 | * | 11/2005 | Popescu-Stanesti et al. . 320/138 |

FOREIGN PATENT DOCUMENTS

| | | |
|---|---|---|
| TW | I242358 | 10/2005 |
| TW | I246789 | 1/2006 |

* cited by examiner

*Primary Examiner* — Ramy Ramadan

(57) ABSTRACT

A power management system is described. The power management system includes an input power selecting unit, a charging control unit and a power switching control unit. The input power selecting unit receives a plurality of input power sources for selecting one of the input power sources to be inputted to the electronic apparatus. The charging control unit includes a charging controller and a battery. The charging controller receives a charge-enabling signal. The battery is charged by a second voltage and selectively supplies a battery power. The power switching control unit outputs a driving voltage to drive the electrical apparatus based on an adaptor-enabling signal and a power-detecting signal when the power switching control unit switches the input power sources and the battery power to select one of the input power sources and the battery power. The power switching control unit actuates the charging control unit by the adaptor-enabling signal and a system-enabling signal for charging the battery by the second voltage generated from one of the input power sources.

27 Claims, 1 Drawing Sheet

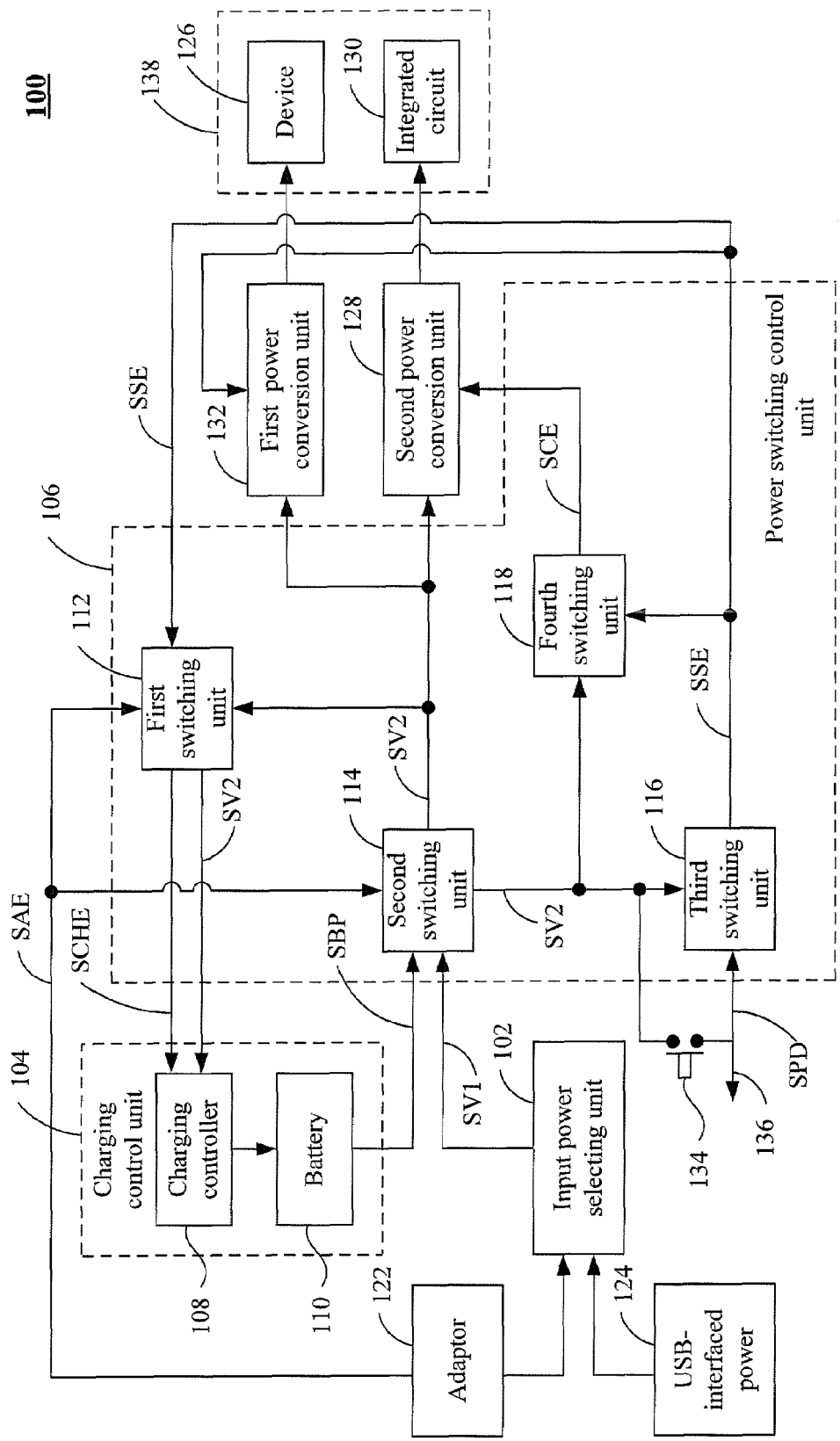

POWER MANAGEMENT SYSTEM HAVING CHARGING CONTROL UNIT AND POWER SWITCHING CONTROL UNIT

CROSS REFERENCE TO RELATED APPLICATION

This patent application is a Continuation-in-Part and claims priority of U.S. application Ser. No. 11/758,536, entitled "AUTOMATIC CHARGING AND POWER MANAGEMENT DEVICE", which is filed on Jun. 5, 2007 now abandoned, incorporated herein by reference.

FIELD OF THE INVENTION

The present invention relates to a power system, and more particularly relates to a power management system having a charging control unit and a power switching control unit wherein the power management system is applicable to a potable direct-current (DC) power supply and a rechargeable battery device used in an electrical apparatus by detecting the types of input power sources and the operation statuses of power supply for managing the switch of the charging operation and the power supply.

BACKGROUND OF THE INVENTION

Portable mass data storage and data processing devices, such as portable disk drives, mobile phones, notebook computers, and personal data assistants (PDAs), must be provided with direct-current (DC) battery power for electrical charge or a built-in power supply for supplying DC power. However, the conventional DC power supply is primarily DC battery or cells. Each of the portable devices, such as the portable disk drives, the mobile phones, notebook computers, and personal data assistants, are not compatible thereamong in power supply so that a variety of DC batteries and corresponding chargers must be provided for different portable devices. This makes it difficult to carry and use these portable devices.

A compound battery charger is conventionally available for providing a variety of batteries with charging function. However, the conventional portable devices cannot perform the conversion and switch operations among different power supplies or input power sources based on the power management. Further, the conventional compound charging device uses a control chip to carry out the power management control. The control chip controls the management of the charging circuit and power sources by means of multiple sets of input/output (I/O) terminals. However, the number of the I/O terminals is proportional to the costs of design and manufacturing of the power management circuit. In other words, the charging device would be more costly if a control chip having more I/O terminals is used. This is adverse against industrial use and economic performance for manufacturing the charging device.

In addition, the conventional charging control device or compound charging device cannot automatically switch among different control functions to select the optimum charging and power supply operations based on the type of the input power source. This disadvantageously results in an excessive electrical current for charging operation and power supply operation. For example, in case the input power source is a USB-interfaced power source that supplies a small current, when charging to a lithium battery and power supply operation are both performed, power consumption will be significantly increased and the circuit will be over-loaded, which results in damage to the operation and parts of the circuit. Thus, this causes inconvenience and troubles in the applications of the conventional charging device and the conventional compound power supply. Consequently, there is a need to improve the conventional power management system to solve the aforementioned problems.

SUMMARY OF THE INVENTION

First objective of the present invention is to provide a power management system having a charging control unit and a power switching control unit. The power switching control unit of the power management system automatically switches between a charging operation to a rechargeable battery and a power supply function by the power switching control unit. The power switching control unit detects the types of input power sources and the operation statuses of power supply for managing the switch operation of the charging operation and the power supply.

Second objective of the present invention is to provide a power management system having a charging control unit and a power switching control unit. The power management system automatically switches between the charging function and the power supply function based on the minimum control terminals including the adaptor-enabling signal and the power-detecting signal for compactly realizing the power control and management.

Third objective of the present invention is to provide a power management system having a charging control unit and a power switching control unit. The power switching control unit identifies the adaptor-enabling signal to determine that the type of input power source is a USB-interfaced power source which supplies a small current or an adaptor power, e.g. a rectification transformer based power, which supplies a large current. The power switching control unit controls the charging control unit for switching the charging operation and the power supply operation so as to completely eliminate the damage of circuit caused by over-loaded current supplied from the input power source.

According to the above objectives, the present invention sets forth a power management system having a charging control unit and a power switching control unit. The power management system includes an input power selecting unit, a charging control unit and a power switching control unit. The input power selecting unit receives a plurality of input power sources for selecting one of the input power sources to be inputted to the electronic apparatus via the power management system. The charging control unit includes a charging controller and a battery. The charging controller receives a charge-enabling signal. The battery coupled to the charging controller is charged by a second voltage and selectively supplies a battery power to the electronic apparatus.

The power switching control unit is coupled to the input power selecting unit and the charging control unit. The power switching control unit outputs a driving voltage to drive the electrical apparatus based on an adaptor-enabling signal and a power-detecting signal when the power switching control unit switches the input power sources and the battery power to select one of the input power sources and the battery power. The power switching control unit actuates the charging control unit by the adaptor-enabling signal and a system-enabling signal for charging the battery by the second voltage generated from one of the input power sources. For example, the rectification transformer based power source is electrically inserted to the power switching control unit to generate the adaptor-enabling signal (SAE). The power-detecting signal (SPD) is generated by a system actuation switch and the system actuation switch is enabled by introducing the second voltage (SV2).

Specifically, the power switching control unit further includes a first switching unit, a second switching unit, a third switching unit, and a fourth switching unit. The first switching unit is coupled to the charging controller of the charging control unit for generating the charge-enabling signal (SCHE) to actuate the charging control unit for charging the battery based on the second voltage (SV2), the system-enabling signal (SSE) and the adaptor-enabling signal (SAE). The second switching unit is coupled to the input power selecting unit and the first switching unit for selecting one of the battery power (SBP) and the input power sources having a first voltage (SV1) from the input power selecting unit for outputting the second voltage (SV2) according to the adaptor-enabling signal (SAE). The third switching unit is coupled to the first switching unit and the second switching unit for generating the system-enabling signal (SSE) based on the second voltage (SV2) and the power-detecting signal (SPD). The fourth switching unit is coupled to the second switching and the third switching unit for generating a chip-enabling signal (SCE) based on the second voltage (SV2) and the system-enabling signal (SSE) for outputting the driving voltage.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawing, wherein:

FIG. 1 is a schematic block diagram of a power management system having a charging control unit and a power switching control unit according to one embodiment of the present invention.

DETAILED DESCRIPTION OF THE PREFERRED EMBODIMENTS

FIG. 1 is a schematic block diagram of a power management system 100 according to one embodiment of the present invention. The power management system 100 includes an input power selecting unit 102, a charging control unit 104 and a power switching control unit 106. The input power selecting unit 102 receives a plurality of input power sources for selecting one of the input power sources to be inputted to the electronic apparatus 138 via the power management system 100. The charging control unit 104 includes a charging controller 108 and a battery 110. The charging controller 108 receives a charge-enabling signal. The battery 110 coupled to the charging controller 108 is charged by a second voltage from the power switching control unit 106 and selectively supplies a battery power to the electronic apparatus.

The power switching control unit 106 is coupled to the input power selecting unit 102 and the charging control unit 104. The power switching control unit 106 outputs a driving voltage to drive the electrical apparatus based on an adaptor-enabling signal and a power-detecting signal when the power switching control unit 106 switches the input power sources and the battery power to select one of the input power sources and the battery power. The power switching control unit 106 actuates the charging control unit by the adaptor-enabling signal and a system-enabling signal for charging the battery 110 by the second voltage generated from one of the input power sources.

Specifically, the power switching control unit 106 further includes a first switching unit 112, a second switching unit 114, a third switching unit 116, and a fourth switching unit 118. The first switching unit 112 is coupled to the charging controller of the charging control unit 104 for generating the charge-enabling signal (SCHE) to actuate the charging control unit 104 for charging the battery 110 based on the second voltage (SV2), the system-enabling signal (SSE) and the adaptor-enabling signal (SAE). The second switching unit 114 is coupled to the input power selecting unit 102 and the first switching unit 112 for selecting one of the battery power (SBP) and the input power sources having a first voltage (SV1) from the input power selecting unit 102 for outputting the second voltage (SV2) according to the adaptor-enabling signal (SAE). The third switching unit 116 is coupled to the first switching unit 112 and the second switching unit 114, for generating the system-enabling signal (SSE) based on the second voltage (SV2) and the power-detecting signal (SPD). The fourth switching unit 118 is coupled to the second switching 114 and the third switching unit 116, for generating a chip-enabling signal (SCE) based on the second voltage (SV2) and the system-enabling signal (SSE) for outputting the driving voltage. In one embodiment, the first switching unit 112, the second switching unit 114, the third switching unit 116, and the fourth switching unit 118 in the power switching control unit 106, respectively, are composed of a plurality of transistors, logical gates, e.g. AND, OR. NOT gates, software program, hardware, and the combinations thereof for achieving the switching functions. The operations of the first switching unit 112, the second switching unit 114, the third switching unit 116, and the fourth switching unit 118 in the power switching control unit 106 are described in detail below.

In the tables of the present invention, "H" indicates high voltage level which is in an enabling status, "L" indicates low voltage level which is in a disabling status, and "X" means "don't care" which is either enabling status or disabling status in this case. In another case, "H" indicates high voltage level which is in a disabling status, and "L" indicates low voltage level which is in an enabling status. Please refer to Table 1 below. The first switching unit 112 generates the charge-enabling signal (SCHE) to actuate the charging control unit 104 for charging the battery 110 based on the second voltage (SV2), the system-enabling signal (SSE) and the adaptor-enabling signal (SAE).

TABLE 1

| Second voltage (SV2) | System-enabling signal (SSE) | Adaptor-enabling signal (SAE) | Charge-enabling signal (SCHE) |
| --- | --- | --- | --- |
| H (adaptor power) | L | H | H |
| H (adaptor power) | H | H | H |
| H (USB power) | L | L | H |
| H (USB power) | H | L | L |

When the adaptor-enabling signal (SAE) is in high level and the system-enabling signal (SSE) is in either high level or low level, the first switching unit 112 generates the charge-enabling signal (SCHE) in high level for actuating the charging control unit 104 to charge the battery 110 by the second voltage (SV2), i.e. the adaptor power from the adaptor 122.

When the second voltage (SV2), i.e. USB power, is in high level, and the system-enabling signal (SSE) and the adaptor-enabling signal (SAE) are in low level, the first switching unit 112 generates the charge-enabling signal (SCHE) in high level for actuating the charging control unit 104 to charge the battery 110 by the second voltage (SV2), i.e. USB power from the USB-interfaced power 124. That is, the charging controller 108 of the charging control unit 104 employs the second voltage (SV2) for charging the battery 110 based on the charge-enabling signal (SCHE). Meanwhile, the USB power is totally supplied to the charging control unit 104 to charge the battery 110 by the second voltage (SV2) when the third switching unit 116 is inactive, the system-enabling signal (SSE) is disabled and thus the power switching control unit 106 does not output the USB power to the external device 126.

When the second voltage (SV2), i.e. USB power, and the system-enabling signal (SSE) are in high level, and the adaptor-enabling signal (SCHE) is in low level, the first switching unit 112 generates the charge-enabling signal (SCHE) in low level for disabling the charging controller 108 of the charging control unit 104. Meanwhile, the USB power is totally supplied to the power switching control unit 106 by the second voltage (SV2) when the third switching unit 116 is active, the system-enabling signal (SSE) is enabled and thus the power switching control unit 106 totally outputs the USB power to the external device 126.

According to the above-mentioned descriptions in Table 1, the first switching unit 112 of the power switching control unit 106 receives the second voltage (SV2), the system-enabling signal (SSE), the adaptor-enabling signal (SAE) for determining the status of the charge-enabling signal (SCHE). The power switching control unit 106 controls the charging control unit 104 for charging the battery 110 based on the type of input power source, e.g. either the adaptor power from the adaptor 122 or USB power from the USB-interfaced power 124. Further, the power switching control unit 106 controls the charging control unit 104 to determine whether the charging control unit 104 charges the battery 110 based on the statuses, e.g. either high level or low level, of the system-enabling signal (SSE) and the adaptor-enabling signal (SAE).

Therefore, the power switching control unit 106 of the power management system 100 automatically switches between a charging operation to a rechargeable battery 110 and a power supply function by the power switching control unit 106. The power switching control unit 106 detects the types of input power sources (122, 124) and the operation statuses of power supply for managing the switch operation of the charging operation and the power supply.

Please refer to Table 2 below. The second switch 114 selects one of the battery power (SBP) and the input power sources having the first voltage (SV1) from the input power selecting unit 102 for outputting the second voltage (SV2) according to the adaptor-enabling signal (SAE). That is, the second switch 114 outputs the selected input power source, e.g. adaptor power or USB power, having the second voltage (SV2) when the adaptor-enabling signal (SAE) is in high level, and the second switch 114 outputs the battery power having the second voltage (SV2) when the adaptor-enabling signal (SAE) is in low level.

Specifically, the adaptor-enabling signal (SAE) from the adaptor 122 determines that one of the input power sources and the battery power (SBP) is supplied to the second switching unit 114 of the power switching control unit 106. In one case, when the first voltage (SV1) and the adaptor-enabling signal (SAE) are in high level, and the battery power (SBP) is in low level, the second switching unit 114 is supplied with the first voltage (SV1), e.g. either adaptor power or USB power, to be the second voltage (SV2). In another case, when the first voltage (SV1) and the adaptor-enabling signal (SAE) are in low level, and the battery power (SBP) is in high level, the second switching unit 114 is supplied with the battery power (SBP) to be the second voltage (SV2).

TABLE 2

| First voltage (SV1) | Battery power (SBP) | Adaptor-enabling signal (SAE) | Second voltage (SV2) |
|---|---|---|---|
| H (adaptor or USB power) | L | H | H (adaptor or USB power) |
| L | H | L | H (battery power) |

Please refer to Table 3 below. The third switching unit 116 generates the system-enabling signal (SSE) based on the second voltage (SV2) and the power-detecting signal (SPD). In one case, the third switching unit 116 generates the system-enabling signal (SSE) in high level when the second voltage (SV2) and the power-detecting signal (SPD) are in high level. In another case, the third switching unit 116 generates the system-enabling signal (SSE) in low level when the second voltage (SV2) is in high level and the power-detecting signal (SPD) in low level. Therefore, the third switching unit 116 employs the power-detecting signal (SPD) to determine whether the third switching unit 116 generates the system-enabling signal (SSE) in high level. For example, the power-detecting signal (SPD) is generated by a system actuation switch 134, e.g. a power on/off button of the electrical apparatus 138. The system actuation switch 134 is electrically connected to a power key input/output terminal 136. When the system actuation switch 134 is enabled by introducing the second voltage (SV2) to the power key input/output terminal 136, the system including the external device 126 and the control circuit 130 is actuated by the power.

TABLE 3

| Second voltage (SV2) | Power-detecting signal (SPD) | System-enabling signal (SSE) |
|---|---|---|
| H | L | L |
| H | H | H |

Please refer to Table 4 below. The fourth switching unit 118 generates the chip-enabling signal (SCE) based on the second voltage (SV2) and the system-enabling signal (SSE). In one case, the fourth switching unit 118 generates the chip-enabling signal (SCE) in high level for triggering the first power conversion unit 128 when the second switching unit 114 supplies the second voltage (SV2) in high level to the fourth switching unit 118 and the third switching unit 116 enables the fourth switching unit 118 by the system-enabling signal (SSE) in high level. The first power conversion unit 128 then converts the second voltage (SV2) to output a first driving voltage for driving the control circuit 130. In another case, since the third switching unit 116 disables the fourth switching unit 118 by the system-enabling signal (SSE) in low level, the fourth switching unit 118 generates the chip-enabling signal (SCE) in low level when the second switching unit 114 supplies the second voltage (SV2) in either high level or low level to the fourth switching unit 118. Therefore, the fourth switching unit 118 employs the system-enabling signal (SSE) to determine whether the first power conversion unit 128 is driven by the second voltage (SV2) from the second switching unit 114.

The power management system 100 automatically switches between the charging function and the power supply function based on the minimum control terminals including the adaptor-enabling signal (SAE) and the power-detecting signal (SPD) for compactly realizing the power control and management. In one embodiment, the rectification transformer based power source 122 is electrically inserted to the power switching control unit 106 to generate the adaptor-enabling signal (SAE). The power-detecting signal (SPD) is generated by a system actuation switch 134 when the system actuation switch 134 is enabled for introducing the second voltage (SV2) to the power key input/output terminal 136. The power key input/output terminal 136 then controls the status of the power-detecting signal (SPD) after the power-detecting signal (SPD) of the system actuation switch 134 is enabled.

TABLE 4

| Second voltage (SV2) | System-enabling signal (SSE) | Chip-enabling signal (SCE) |
|---|---|---|
| H | H | H |
| X | L | L |

According to the above-mentioned descriptions, the power switching control unit 106 identifies the adaptor-enabling signal to determine that the type of input power source is a USB-interfaced power source which supplies a small current or an adaptor power, e.g. a rectification transformer based power, which supplies a large current. The power switching control unit 106 controls the charging control unit for switching the charging operation and the power supply operation so as to completely eliminate the damage of circuit caused by over-loaded current supplied from the input power source.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A power management system for an electrical apparatus, the power management system comprising:
    a charging control unit, comprising:
        a charging controller, for receiving a charge-enabling signal; and
        a battery coupled to the charging controller, for being charged by a second voltage and for selectively supplying a battery power to the electrical apparatus via the power management system; and
    a power switching control unit coupled to the charging control unit, wherein the power switching control unit outputs a driving voltage to drive the electrical apparatus based on an adaptor-enabling signal and a power-detecting signal when the power switching control unit switches a plurality of input power sources and the battery power to select one of the input power sources and the battery power, and the power switching control unit actuates the charging control unit by the adaptor-enabling signal and a system-enabling signal for charging the battery by the second voltage generated from one of the input power sources;
    wherein the power switching control unit further comprises:
        a first switching unit coupled to the charging controller of the charging control unit, for generating the charge-enabling signal (SCHE) to actuate the charging control unit for charging the battery based on the second voltage (SV2), the system-enabling signal (SSE) and the adaptor-enabling signal (SAE);
        a second switching unit coupled to an input power selecting unit and the first switching unit, for selecting one of the battery power (SBP) and the input power sources having a first voltage (SV1) from the input power selecting unit for outputting the second voltage (SV2) according to the adaptor-enabling signal (SAE);
        a third switching unit coupled to the first switching unit and the second switching unit, for generating the system-enabling signal (SSE) based on the second voltage (SV2) and the power-detecting signal (SPD); and
        a fourth switching unit coupled to the second switching unit and the third switching unit, for generating a chip-enabling signal (SCE) based on the second voltage (SV2) and the system-enabling signal (SSE) for outputting the driving voltage.

2. The power management system of claim 1, further comprising the input power selecting unit coupled to the power switching unit, for receiving the input power sources for selecting one of the input power sources to be inputted to the electronic apparatus via the power management system.

3. The power management system of claim 1, wherein one of the input power sources comprises a USB-interfaced power source.

4. The power management system of claim 1, wherein one of the input power sources comprises a rectification transformer based power source.

5. The power management system of claim 4, wherein the rectification transformer based power source is electrically inserted to the power switching control unit to generate the adaptor-enabling signal (SAE).

6. The power management system of claim 1, wherein the power-detecting signal (SPD) is generated by a system actuation switch and the system actuation switch is enabled by introducing the second voltage (SV2).

7. The power management system of claim 1, wherein when the adaptor-enabling signal (SAE) is in high level and the system-enabling signal (SSE) is in either high level or low level, the first switching unit generates the charge-enabling signal (SCHE) in high level for actuating the charging control unit to charge the battery by the second voltage (SV2).

8. The power management system of claim 7, wherein when the second voltage (SV2) is in high level, and the system-enabling signal (SSE) and the adaptor-enabling signal (SCHE) are in low level, the first switching unit generates the charge-enabling signal (SCHE) in high level for actuating the charging control unit to charge the battery by the second voltage (SV2).

9. The power management system of claim 8, wherein when the second voltage (SV2) and the system-enabling signal (SSE) are in high level, and the adaptor-enabling signal (SCHE) is in low level, the first switching unit generates the charge-enabling signal (SCHE) in low level for disabling the charging controller of the charging control unit.

10. The power management system of claim 1, wherein the second switch outputs the selected input power source having the second voltage (SV2) when the adaptor-enabling signal (SAE) is in high level, and the second switch outputs the battery power having the second voltage (SV2) when the adaptor-enabling signal (SAE) is in low level.

11. The power management system of claim 10, wherein the third switching unit generates the system-enabling signal (SSE) in high level when the second voltage (SV2) and the power-detecting signal (SPD) are in high level.

12. The power management system of claim 11, wherein the third switching unit generates the system-enabling signal (SSE) in low level when the second voltage (SV2) is in high level and the power-detecting signal (SPD) in low level.

13. The power management system of claim 1, wherein the fourth switching unit generates the chip-enabling signal (SCE) in high level for triggering the first power conversion unit when the second switching unit supplies the second voltage (SV2) in high level to the fourth switching unit and the third switching unit enables the fourth switching unit by the system-enabling signal (SSE) in high level.

14. The power management system of claim 13, wherein if the third switching unit disables the fourth switching unit by the system-enabling signal (SSE) in low level, the fourth switching unit generates the chip-enabling signal (SCE) in low level when the second switching unit supplies the second voltage (SV2) in either high level or low level to the fourth switching unit.

15. A power management system having an input power selecting unit for receiving a plurality of input power sources for selecting one of the input power sources to be inputted to an electronic apparatus via the power management system, the power management system comprising:
 a charging control unit, comprising:
  a charging controller, for receiving a charge-enabling signal; and
  a battery coupled to the charging controller, for being charged by a second voltage and for selectively supplying a battery power to the electronic apparatus via the power management system; and
 a power switching control unit coupled to the input power selecting unit and the charging control unit, wherein the power switching control unit comprises:
  a first switching unit coupled to the charging controller of the charging control unit, for generating the charge-enabling signal (SCHE) to actuate the charging control unit for charging the battery based on the second voltage (SV2), the system-enabling signal (SSE) and the adaptor-enabling signal (SAE);
  a second switching unit coupled to the input power selecting unit and the first switch, for selecting one of the battery power (SBP) and the input power sources having a first voltage (SV1) from the input power selecting unit for outputting the second voltage (SV2) according to the adaptor-enabling signal (SAE);
  a third switching unit coupled to the first switch and the second switch, for generating the system-enabling signal (SSE) based on the second voltage (SV2) and the power-detecting signal (SPD); and
  a fourth switching unit coupled to the second switch and the third switch, for generating a chip-enabling signal (SCE) based on the second voltage (SV2) and the system-enabling signal (SSE) for outputting the driving voltage.

16. The power management system of claim 15, wherein one of the input power sources comprises a USB-interfaced power source.

17. The power management system of claim 15, wherein one of the input power sources comprises a rectification transformer based power source.

18. The power management system of claim 17, wherein the rectification transformer based power source is electrically inserted to the power switching control unit to generate the adaptor-enabling signal (SAE).

19. The power management system of claim 15, wherein the power-detecting signal (SPD) is generated by a system actuation switch and the system actuation switch is enabled by introducing the second voltage (SV2).

20. The power management system of claim 15, wherein when the adaptor-enabling signal (SAE) is in high level and the system-enabling signal (SSE) is in either high level or low level, the first switching unit generates the charge-enabling signal (SCHE) in high level for actuating the charging control unit to charge the battery by the second voltage (SV2).

21. The power management system of claim 20, wherein when the second voltage (SV2) is in high level, and the system-enabling signal (SSE) and the adaptor-enabling signal (SCHE) are in low level, the first switching unit generates the charge-enabling signal (SCHE) in high level for actuating the charging control unit to charge the battery by the second voltage (SV2).

22. The power management system of claim 21, wherein when the second voltage (SV2) and the system-enabling signal (SSE) are in high level, and the adaptor-enabling signal (SCHE) is in low level, the first switching unit generates the charge-enabling signal (SCHE) in low level for disabling the charging controller of the charging control unit.

23. The power management system of claim 15, wherein the second switch outputs the selected input power source having the second voltage (SV2) when the adaptor-enabling signal (SAE) is in high level, and the second switch outputs the battery power having the second voltage (SV2) when the adaptor-enabling signal (SAE) is in low level.

24. The power management system of claim 23, wherein the third switching unit generates the system-enabling signal (SSE) in high level when the second voltage (SV2) and the power-detecting signal (SPD) are in high level.

25. The power management system of claim 24, wherein the third switching unit generates the system-enabling signal (SSE) in low level when the second voltage (SV2) is in high level and the power-detecting signal (SPD) in low level.

26. The power management system of claim 15, wherein the fourth switching unit generates the chip-enabling signal (SCE) in high level for triggering the first power conversion unit when the second switching unit supplies the second voltage (SV2) in high level to the fourth switching unit and the third switching unit enables the fourth switching unit by the system-enabling signal (SSE) in high level.

27. The power management system of claim 26, wherein if the third switching unit disables the fourth switching unit by the system-enabling signal (SSE) in low level, the fourth switching unit generates the chip-enabling signal (SCE) in low level when the second switching unit supplies the second voltage (SV2) in either high level or low level to the fourth switching unit.

* * * * *